May 21, 1940.  L. G. PERKINS  2,201,243
WHEEL BEARING FOR PLOWS
Filed May 9, 1938  2 Sheets-Sheet 1

INVENTOR
L. G. Perkins
BY
ATTORNEY

May 21, 1940.　　　　L. G. PERKINS　　　　2,201,243
WHEEL BEARING FOR PLOWS
Filed May 9, 1938　　　2 Sheets-Sheet 2
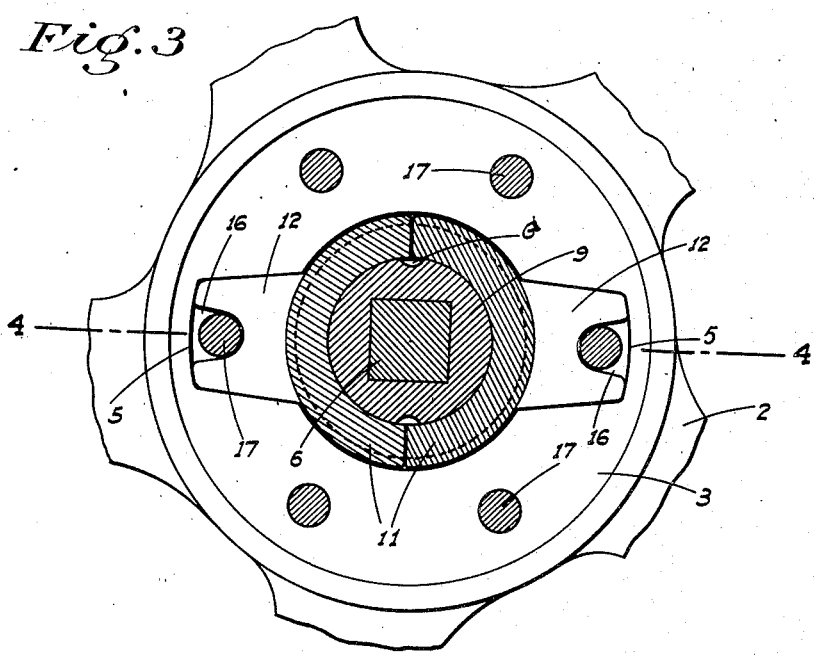
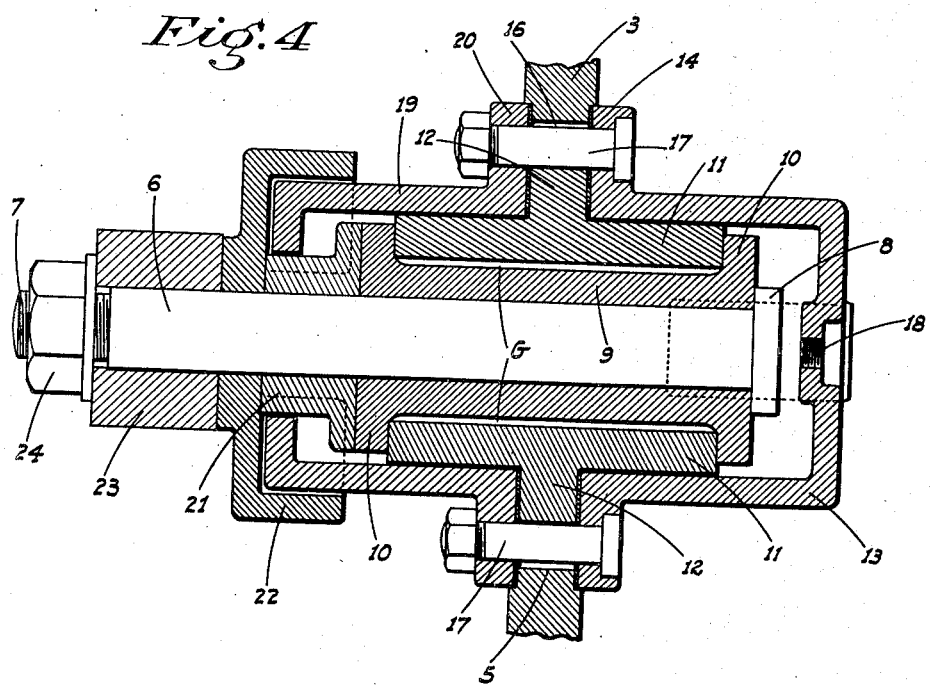
INVENTOR
L. G. Perkins
BY
ATTORNEY Patented May 21, 1940

2,201,243

UNITED STATES PATENT OFFICE 2,201,243

WHEEL BEARING FOR PLOWS

Lyman G. Perkins, Fresno, Calif.

Application May 9, 1938, Serial No. 206,813

7 Claims. (Cl. 308—19)

This invention relates to the bearings for wheels of plows and similar agricultural implements, in which the bearings are subjected to the abrasive action of dirt.

The principal object of my invention is to provide what I believe to be a novel form of wheel and bearing structure for implements of the above type, in which the bearing members are mounted in and turn with the wheel, and are of such a nature that they have great resistance to abrasion, and consequently will last a long time.

A further object is to provide an enclosing and locating means arranged so that the bearings are enclosed and protected from dirt, and may be maintained properly lubricated; while at the same time the bearings may be quickly and easily removed for replacement whenever necessary.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views:

Figure 3 is a vertical section through the bearing structure as mounted in the wheel.

Figure 4 is a longitudinal section of the structure taken on the line 4—4 of Fig. 3.

Figure 1:
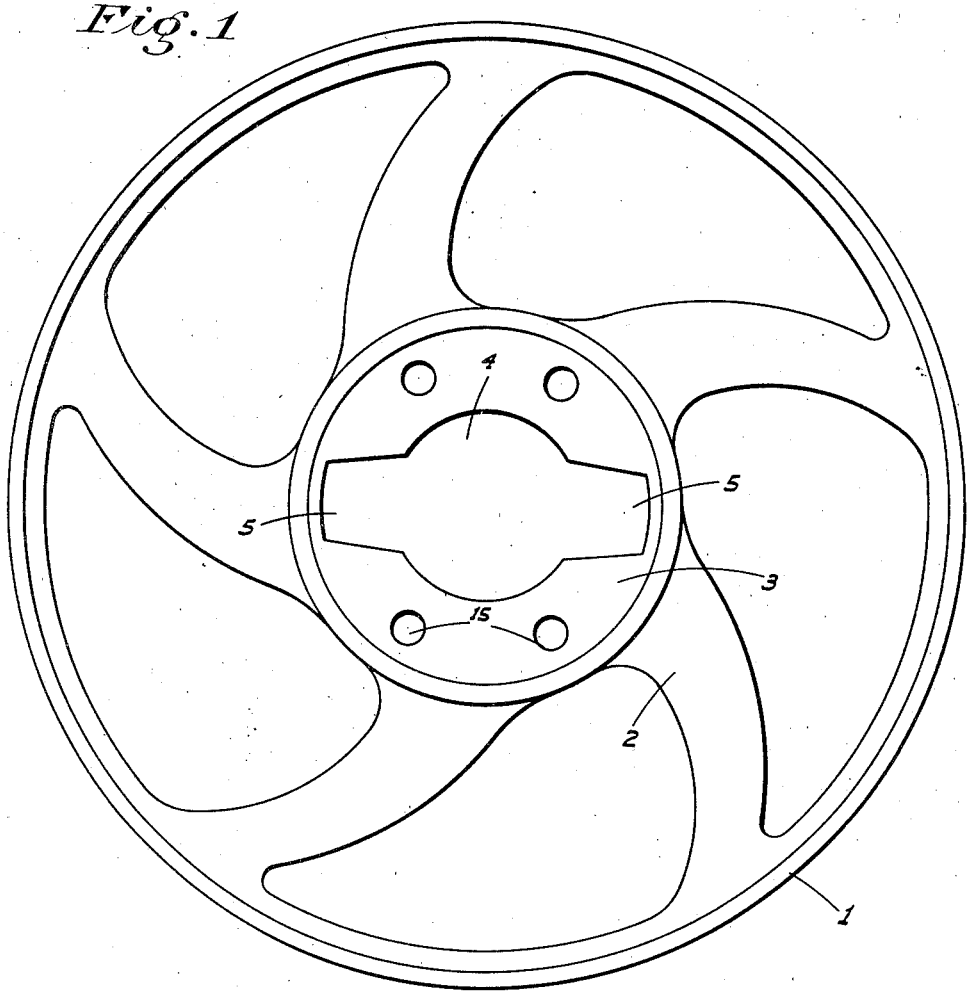
Figure 1 is a side elevation of a plow wheel having a special hub for the reception of my improved bearing.
Figure 2:
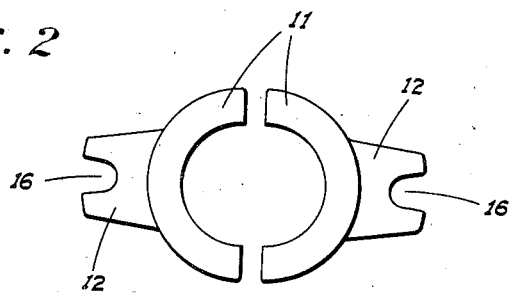
Figure 2 is an end view of the bearing unit detached.

Referring now more particularly to the characters of reference on the drawings, the wheel on which my bearing is applied comprises the tread portion 1 connected by spokes 2 with the central hub, which is in the form of a relatively large flat disc 3. This hub is provided with a central circular opening 4, which is formed with a pair of opposed slots 5.

The axle 6 on which the wheel turns is square except where it is threaded at its inner end as at 7, and has an enlarged head 8 on its outer end. A cylindrical bearing sleeve 9, considerably longer than the thickness of the hub disc 3, but shorter than the axle, is slidably but non-turnably mounted on the axle, and at one end engages the axle head 8. The sleeve is formed with enlarged flanges 10 at its ends and with longitudinally opposed lubricating grooves G between the flanges. Diametrically split bearing members 11 engage the sleeves for the full distance between the flanges, the outside diameter of said members being such that they removably fit the hub opening 4. Each member is formed centrally of its ends with a radial lug 12, which fits one of the slots 5. The lugs are the same thickness as the hub disk, so as not to project therefrom on either side. The bearing members 11 and the sleeve 9 are made of a special grade of white iron manufactured by me, which has a greater resistance to abrasion than manganese steel. Hence, these parts are cast to their proper size and with sufficient initial smoothness to avoid the need of any machining, which cannot be performed on this metal.

The bearing is enclosed on the outer side of the hub disc by a cylindrical housing 13, which slidably fits over the adjacent portions of the bearing members 11, and has an outwardly projecting flange 14 about its inner end. This flange engages the disc 3, and is provided with bolt holes matching the holes 15 in the disc, as well as slots 16 in the lugs 12, so as to receive securing bolts 17. The outer end of the housing 13 is provided with a tapped hole 18 to receive a grease-gun fitting so that lubricant may be injected into the enclosure to penetrate between the sleeve and bearing, and keep the contacting surfaces properly lubricated.

The bearing structure is enclosed on the inner side of the hub disc by another cylindrical housing 19 having an end flange 20 engaging the corresponding face of the disc, and having bolt holes to match those in the disc, so that one set of clamping bolts 17 secures both housings against the hub. It will thus be seen that the bearing members 11 are held against displacement circumferentially of the wheel by the lugs 12, as well as by those bolts 17 which project through the lug slots. The members are held against displacement axially of the wheel by the housing flanges 14 and 20, which extend outwardly beyond the hub slots 5 and the lugs therein, so as to completely enclose the same.

The housing 19 extends some distance beyond the adjacent end of sleeve 9, and at the corresponding end has a central opening which fits over a short sleeve or collar 21, which is non-turnably mounted on the axle, and engages the adjacent end of the sleeve. Said collar 21 extends slightly beyond the adjacent end of the housing 19, and is engaged outwardly of the housing by the inner surface of a dust cap 22, which is non-turnably mounted on the adjacent portion of the axle and overhangs the adjacent end of the housing 19. The cap is clamped against the axle support standard 23, in which the axle is non-turnable, by the nut 24 on the threaded end of the axle. It will thus be seen that tightening the nut will move the axle lengthwise, and will cause the axle head 8 to pull against the sleeve and shift the same along the axle until the sleeve collar, dust cap and standard are all held in firmly clamped relation with each other. At the same time this clamping action has no binding or other effect on the wheel or any parts secured thereto, and which would interfere with the desired freedom of rotation of the wheel.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. A wheel and bearing structure comprising a wheel having a hub provided with a central opening formed with opposed slots, a bearing unit comprising diametrically split members projecting through the opening and having radially projecting lugs fitting said slots, an axle-mounted sleeve engaged by the bearing members and housings secured on the hub on opposite sides thereof to enclose the bearing unit and also providing means preventing removal of the unit from the hub.

2. A structure as in claim 1, in which the bearing unit lugs are substantially the thickness of the hub and the housings include end flanges abutting and secured against the hub on opposite sides and covering the hub-opening slots and the lugs therein.

3. A wheel and bearing structure comprising a wheel having a disc-like hub provided with a central opening, a bearing unit longer than the thickness of the disc removably projecting through the opening, means between the hub and unit preventing relative rotation of the hub and unit, an axle for the wheel having a head on one end, a bearing sleeve slidable on the axle and engaged at one end against the head, said sleeve being engaged by the bearing unit and having end flanges preventing relative axial movement of the bearing unit and sleeve, a standard through which the end of the axle opposite the head slidably projects, a collar slidable on the axle between the standard and the adjacent end of the sleeve, housings secured on and projecting from opposite sides of the hub and enclosing the bearing unit and sleeve, one housing terminating short of the outer end of the collar in closely surrounding relation thereto, a dust cap slidably mounted on the axle between the collar and standard and overlapping the adjacent end portion of said one housing, and means to draw the axle through the standard whereby to pull the axle head, sleeve, collar, cap, and standard into close contact with each other.

4. A wheel and bearing structure comprising a wheel having a hub provided with a central opening, a bearing unit removably projecting through said opening and removable by axial movement in either direction, means removably securing the unit in connection with the hub against relative rotation and axial movement, an axle supported bearing sleeve engaged by the unit, and end flanges on the sleeve overlapping the ends of the unit but of smaller diameter than the hub opening.

5. A wheel and bearing structure comprising a wheel having a hub provided with a central opening, a bearing unit removably projecting through said opening, and comprising a pair of diametrically split members, the hub having opposed radial slots communicating with the central opening, a lug on each member removably fitting one of the slots and substantially the same thickness as the depth of the slots, an axle supported sleeve engaged by the bearing members, end flanges on the sleeve overlapping the ends of said members and of smaller diameter than the hub opening whereby the hub may be withdrawn axially from surrounding relation with the bearing unit and means to releasably hold the hub against such axial movement and including flanges extending about the hub on opposite sides and overlapping the hub slots and the lugs therein and releasably securing bolts through the hub and flanges.

6. A wheel bearing structure comprising with a wheel having a disc-like hub provided with a central opening, and an axle projecting through said opening, a sleeve non-turnably mounted on the axle, end flanges integral with the sleeve, a bearing unit comprising diametrally split members engaging the sleeve between the flanges, a radial lug projecting from each member and means to secure the lugs in fixed connection with the hub.

7. A wheel and bearing structure comprising a wheel having a disc-like hub provided with a central opening formed with opposed slots, a bearing unit projecting through the opening, radial lugs on the unit substantially fitting the slots, an axle mounted sleeve engaged by the bearing unit and members mounted on the hub on opposite sides thereof and preventing removal of the lugs from the slots.

LYMAN G. PERKINS.